United States Patent
Jones et al.

(10) Patent No.: US 9,081,135 B1
(45) Date of Patent: Jul. 14, 2015

(54) METHODS AND DEVICES FOR MAINTAINING A RESONANT WAVELENGTH OF A PHOTONIC MICRORESONATOR

(71) Applicant: Sandia Corporation, Albuquerque, NM (US)

(72) Inventors: Adam Jones, Albuquerque, NM (US); William A. Zortman, Corrales, NM (US)

(73) Assignee: Sandia Corporation, Albuquerque, NM (US)

( * ) Notice: Subject to any disclaimer, the term of this patent is extended or adjusted under 35 U.S.C. 154(b) by 74 days.

(21) Appl. No.: 14/011,498

(22) Filed: Aug. 27, 2013

(51) Int. Cl.
  *G02B 6/12* (2006.01)
  *G02B 6/26* (2006.01)
  *G02B 6/46* (2006.01)

(52) U.S. Cl.
  CPC ... *G02B 6/12* (2013.01); *G02B 6/46* (2013.01)

(58) Field of Classification Search
  None
  See application file for complete search history.

(56) References Cited

U.S. PATENT DOCUMENTS

| 6,636,668 B1 * | 10/2003 | Al-hemyari et al. | 385/40 |
| 7,941,014 B1 * | 5/2011 | Watts et al. | 385/32 |
| 8,768,170 B2 * | 7/2014 | Krishnamoorthy et al. | 398/79 |

OTHER PUBLICATIONS

Characteristics of Microring Resonators With Waveguide-Resonator Coupling Modulation, Sacher et al, Journal of Lightwave Technology, V. 27, No. 17, Sep. 1, 2009.

* cited by examiner

*Primary Examiner* — Omar Rojas
(74) *Attorney, Agent, or Firm* — Martin I. Finston

(57) ABSTRACT

A photonic microresonator incorporates a localized heater element within a section of an optical bus waveguide that is in proximity to the resonator structure. The application of an adjustable control voltage to the heater element provides a localized change in the refractive index value of the bus waveguide, compensating for temperature-induced wavelength drift and maintaining a stabilized value of the microresonator's resonant wavelength.

18 Claims, 5 Drawing Sheets

METHODS AND DEVICES FOR MAINTAINING A RESONANT WAVELENGTH OF A PHOTONIC MICRORESONATOR

GOVERNMENT LICENSE RIGHTS

This invention was developed under Contract DE-AC04-94AL85000 between Sandia Corporation and the U.S. Department of Energy. The U.S. Government has certain rights in this invention.

INTRODUCTION

Silicon-based photonic microresonators play a crucial role in the development of high-speed optical communication links, allowing for the creation of devices such as ultra-low power tunable filters, modulators and the like within a relatively small footprint on a complementary metal oxide semiconductor (CMOS)-compatible platform. Indeed, these silicon-based devices will ultimately enable direct integration of electronic and photonic communication devices for applications including next-generation supercomputing and data centers.

The performance of a silicon-based photonic microresonator depends upon a number of factors, including the physical design of its resonator structure, which may take the form of a ring or disk (hereafter referred to as "resonator structure") disposed on a portion of a silicon substrate, for example. An optical waveguide disposed in proximity to the resonator structure allows for evanescent coupling of an optical signal propagating along the waveguide into the resonator structure. The specific wavelength of the signal coupled into the resonant structure is a function of the properties of the structure itself (e.g., dimensional properties such as its circumference, and material properties such as its refractive index). Indeed, resonator structures of differing dimensions will out-couple (e.g., evanescently couple) different wavelengths from an adjacent optical waveguide (thus providing differing filtering characteristics). In particular, variations in the refractive index of the silicon-based material forming a resonator structure will, more than likely, lead to the microresonator operating at wavelength other than a desired, resonant wavelength.

Silicon-based photonic microresonators have been found to be susceptible to transient thermal effects that cause the refractive index of the resonator structure to vary or fluctuate (i.e., become unstable).

SUMMARY

The present invention relates to a photonic microresonator apparatus that addresses the resonant wavelength instability problem by incorporating a localized heater element within a section of an optical bus waveguide that is in proximity to the resonator structure. The application of an adjustable control voltage to the heater element creates a localized change in the refractive index value of the bus waveguide, compensating for temperature-induced wavelength drift and maintaining a stabilized value of the microresonator's resonant wavelength.

In accordance with one embodiment of the present invention, a silicon-based photonic microresonator apparatus may comprise a photonic resonator structure formed on a silicon substrate (e.g., an optical ring resonator, such as a circular resonator, oval resonator, or elliptical resonator, or an optical disk resonator). The resonator structure may be configured to operate at a selected resonant wavelength. The apparatus may additionally comprise: an optical bus waveguide formed on the silicon substrate and disposed to provide evanescent coupling at the selected resonant wavelength into the resonator structure; and a heater element disposed adjacent to a section of the optical bus waveguide, and substantially close to the resonator structure, the heater element comprising a region of doped silicon configured to (i) modify a temperature of the adjacent section of the optical bus waveguide upon the application of a voltage thereto, the temperature changed by an amount adjusted to compensate for transient thermal fluctuations in the resonator structure, and (ii) to maintain the resonant wavelength at the selected resonant wavelength.

In another embodiment, the apparatus may further comprise a wavelength tuning element for changing the selected resonant wavelength of the photonic resonator structure to a new, different selected resonant wavelength.

In accordance with embodiments of the invention, the optical waveguide may be configured to have a radius of curvature that is substantially similar to a curvature of the photonic resonator structure so as to increase an optical path length along which evanescent coupling occurs, and the optical bus waveguide and the photonic resonator structure are configured to increase an optical coupling efficiency.

In yet another embodiment, the apparatus may further comprise a heater control feedback section. The section may comprise: (I) an optical tap coupler disposed along a portion of the optical bus waveguide, and configured to couple a substantially small amount of an optical signal propagating along the bus waveguide; (ii) a feedback optical waveguide connected to the optical tap coupler and configured to receive the coupled optical signal; and (iii) a heater control circuit configured to convert the coupled optical signal into an equivalent electrical photocurrent, and determine a proper output voltage signal to modify the temperature of the heater element to compensate for the transient thermal fluctuations by correlating random values of the output voltage signal with changes in the received photocurrent and selecting the proper output voltage required to stabilize the selected resonant wavelength in the presence of transient thermal fluctuations.

The heater element may be disposed adjacent to the optical waveguide on the substrate surface, or above and in proximity to the optical waveguide. The heater element may comprise a doped section of silicon substrate.

In addition to the apparatuses described above, the present invention also provides photonic microresonator systems. For example, one exemplary system may comprise: an optical bus waveguide formed on a silicon substrate and configured to receive a plurality of propagating optical signals, each optical signal operating at a different wavelength; a plurality of photonic microresonator structures disposed along, and in proximity to, the optical bus waveguide, each photonic microresonator structure configured to operate at a different resonant wavelength; and a plurality of separate heater elements, each element disposed adjacent to a section of the optical bus waveguide and substantially close to a separate one of the plurality of photonic microresonator structures, each heater element comprising a region of doped silicon, and configured to modify a temperature of the adjacent section of the optical bus waveguide upon the application of a voltage thereto, the temperature changed by an amount desired to compensate for transient thermal fluctuations in the wavelengths of the propagating optical signals.

The present invention further provides methods for maintaining a resonant wavelength of a photonic microresonator. One such exemplary method may comprise: forming a photonic resonator structure on a silicon substrate (e.g., an optical ring resonator, such as a circular resonator, oval resonator, or elliptical resonator, or an optical disk resonator), and configuring the resonator structure to operate at a selected resonant wavelength; forming an optical bus waveguide on the silicon substrate in proximity to the resonator structure; and disposing a heater element adjacent to a section of the optical bus waveguide, and substantially close to the resonator structure, the heater element comprising a region of doped silicon configured for (i) modifying a temperature of the adjacent section of the optical bus waveguide upon the application of a voltage thereto, the temperature changed by an amount adjusted to compensate for transient thermal fluctuations in the resonator structure, and (ii) to maintain the resonant wavelength at the predetermined resonant wavelength.

The method may further comprise changing the resonant wavelength of the photonic resonator structure using a wavelength tuning element, and/or (i) coupling a substantially small amount of an optical signal propagating along the bus waveguide; (ii) converting the coupled optical signal into an equivalent electrical photocurrent; and (iii) determining a proper output voltage signal to modify the temperature of the heater element to compensate for the transient thermal fluctuations by correlating random values of the output voltage signal with changes in the received photocurrent and selecting the proper output voltage required to stabilize the selected resonant wavelength in the presence of transient thermal fluctuations.

In an embodiment of the invention, the optical waveguide may have a radius of curvature that is substantially similar to a curvature of the photonic resonator structure.

BRIEF DESCRIPTION OF THE DRAWINGS

Referring now to the drawings, where like numerals represent like parts in several views.

DETAILED DESCRIPTION

Including Examples

Throughout the following description and drawings, like reference numbers/characters refer to like elements. It should be understood that, although specific exemplary embodiments are discussed herein there is no intent to limit the scope of present invention to such embodiments. To the contrary, it should be understood that the exemplary embodiments discussed herein are for illustrative purposes, and that modified and alternative embodiments may be implemented without departing from the scope of the present invention.

It should be further noted that some exemplary embodiments may be described and claimed as a process or method (hereafter "method"). Though a method may be described and claimed as set of sequential steps, it should be understood that the steps may be performed in parallel, concurrently or simultaneously. In addition, the order of each step within a method may be re-arranged. A method may be terminated when completed, and may also include additional steps not necessarily described herein. A method may correspond to functions or processes completed by a physical system.

As used herein, the term "and/or" includes any and all combinations of one or more of the associated listed items. It should be understood that if an element is referred to, or depicted, as being positioned "on", "along" or "adjacent" another element it may be completely on, along or adjacent the other element or substantially on, along or adjacent the other element, unless otherwise specified or understood by the context of the description or drawings. As used herein, the singular forms "a," "an" and "the" are not intended to include the plural form unless the context clearly indicates otherwise.

As used herein, the term "embodiment" refers to an example of the present invention.

Figure 1:
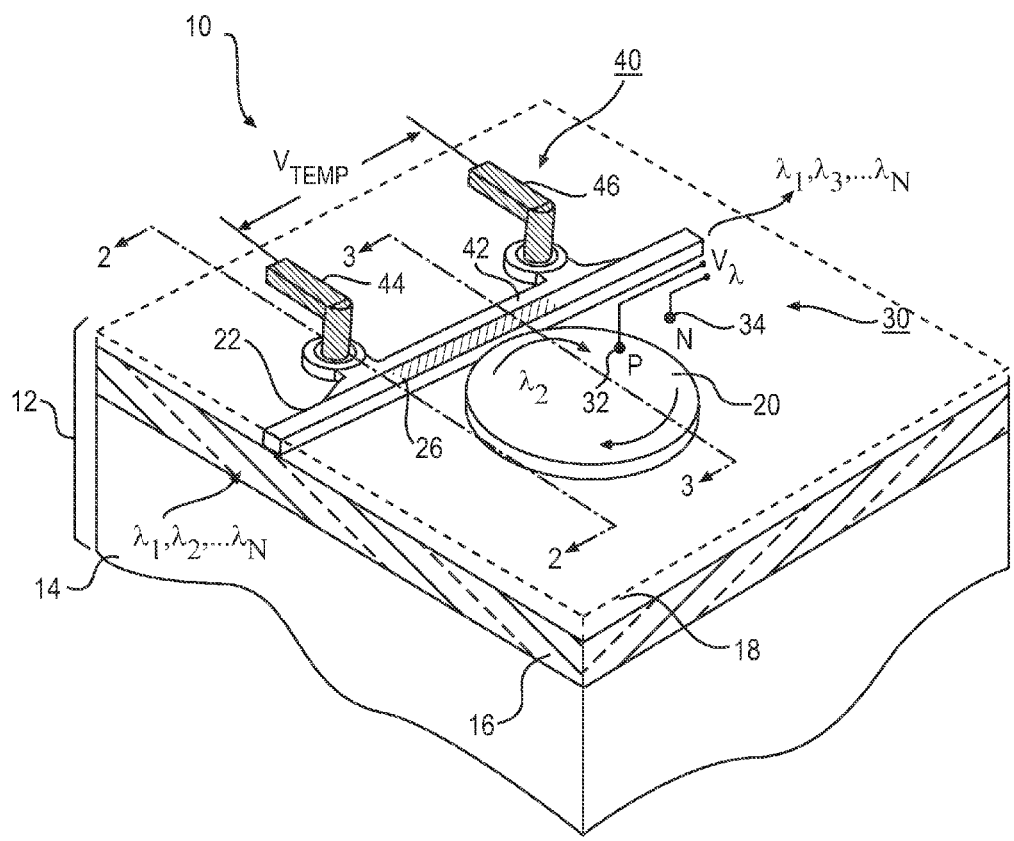
FIG. 1 is an isometric view of a silicon-based photonic microresonator apparatus in accordance with an exemplary embodiment of the present invention.

FIG. 1 is an isometric view of a silicon-based photonic microresonator apparatus 10 formed in accordance with an exemplary embodiment of the present invention. The term "photonic microresonator" as used herein includes a photonic resonator that includes a curved outer sidewall and a closed-loop optical path for light circulating therein. Thus, the term "photonic microresonator" includes both open-ring resonators that can have an annular shape (which may be circular, elliptical or oval) and closed-ring resonators that can have a disk shape (i.e., a solid circle form). For the sake of clarity, open-ring resonators will be referred to as "ring resonators" and closed-ring resonators will be referred to as "disk resonators", with the term "resonator" intended to refer to either type of structure.

To form a silicon-based photonic microresonator, a silicon-on-insulator (SOI) substrate may be used. An SOI typically comprises a monocrystalline silicon body and a monocrystalline silicon layer sandwiched about a silicon oxide layer. In accordance with an embodiment of the invention, a photonic microresonator apparatus may generally include an optical waveguide for supporting the propagation of one or more optical signals, generally at one or more wavelengths, and a resonator structure that is positioned adjacent to the optical waveguide and configured to out-couple (e.g., evanescently couple) any of the propagating signals at a resonant wavelength of the resonator structure. Each of the resonator structures and associated optical bus waveguides may be formed from the monocrystalline silicon layer of the SOI substrate, using well-known CMOS fabrication processes. While SOI-based structures are prevalent in many photonic integrated circuit products, it is to be understood that the photonic microresonators of the present invention may be formed in any other appropriate type of silicon-based system.

In the embodiment shown in FIG. 1, a photonic microresonator apparatus 10 is formed on an SOI substrate 12 that comprises a silicon body 14, a silicon oxide layer 16 and a monocrystalline silicon surface layer 18 (layer 18 shown in phantom, having been processed to form the individual components of photonic microresonator apparatus 10). In this case, microresonator apparatus 10 may comprise a disk resonator structure 20 and associated optical bus waveguide 22. Both disk resonator structure 20 and optical waveguide 22 may be formed by applying conventional CMOS fabrication processes (e.g., patterning and etching) to silicon surface layer 18.

As is known in the art, the specific properties of the disk resonator structure 20 can be controlled such that a propagating optical signal of a particular wavelength (i.e., "resonant wavelength"), will be coupled (e.g., evanescently) between optical bus waveguide 22 and disk resonator structure 20, and, thereafter, continue to circulate within disk resonator structure 20. For example, if a plurality of N optical signals operating at wavelengths $\lambda_1, \lambda_2, \ldots \lambda_N$ are propagating along optical bus waveguide 22 in the direction shown in FIG. 1, disk resonator structure 20 can be configured (in terms of circumference, refractive index, etc.) to couple only the signal operating at wavelength $\lambda_2$, allowing the other remaining signals operating at $\lambda_1, \lambda_3, \ldots, \lambda_N$ to continue to propagate along optical bus waveguide 22. That is, the wavelength $\lambda_2$ is selected by the user as the resonant wavelength for structure 20. In this case, photonic microresonator apparatus 10 may be configured as an optical filter to prevent any signal operating at wavelength $\lambda_2$ from exiting optical bus waveguide 22. Wavelength $\lambda_2$ may be referred to as the "resonant wavelength" of photonic microresonator apparatus 10.

In many cases, it is desired to be able to tune (or switch) the selected resonant wavelength of a photonic microresonator. In some arrangements, the application of a bias voltage across a portion of the resonator structure (ring or disk) is used to change the refractive index of the resonator structure. This change in refractive index will change the "optical length" of the resonator's circumference and, as a result, change the resonant wavelength of the photonic microresonator (that is, define a new selected resonant wavelength).

FIG. 1 illustrates one such exemplary resonant wavelength tuning element 30 comprising a pair of P-doped and N-doped regions 32 and 34. As shown, regions 32 and 34 may be disposed to surround a section 24 of disk resonator structure 20. The application of a wavelength tuning voltage $V_\lambda$ between contacts 32 and 34 will modify the local refractive index of disk resonator structure 20 and, therefore, change the value of its resonant wavelength. In some applications, the applied signal $V_\lambda$ may be a constant value, or adjustable as part of a closed-loop feedback arrangement. In particular, when used as part of an optical modulator, $V_\lambda$ may be a modulated input signal that creates a variable resonant wavelength within disk resonator structure 20 (providing an "active latching" structure for an optical modulator).

As mentioned above, transient thermal effects are generally present in a silicon-based structure, where fluctuations in the temperature of a silicon-based photonic microresonator create transient variations in its refractive index. These unwanted transients result in unwanted fluctuations in its resonant wavelength. Previous attempts to overcome the problems associated with transient thermal effects utilized arrangements to stabilize (or manage) the temperature of the resonator structure by including an electronic signal-controlled heater element within the resonator structure. However, the use (and presence) of heater control signals interferes with the wavelength tuning signal $V_\lambda$ described above. This interference may be especially problematic in systems that require the use of low voltage differential signaling (for example, extreme-scale computing).

Accordingly, in accordance with embodiments of the present invention, to substantially minimize interference between the wavelength tuning electrical signal $V_\lambda$ and a temperature stabilizing heater control signal (referred to as $V_{temp}$), the heater element may be positioned at one or more inventive locations along the optical bus waveguide, thus increasing the spacing between the two electrical signals to a value that minimizes or substantially eliminates interference. Referring to FIG. 1, a heater element 40 is shown as disposed adjacent to a section 26 of optical bus waveguide 22 that is substantially close to disk resonator structure 20 (the term "substantially close" means at least close enough for evanescent coupling between the optical bus waveguide and the resonator structure, and at times refers to disposing the optical bus waveguide "in proximity to" the resonator structure). For SOI-based photonic resonators, separations between the optical waveguide and the resonator structure may vary from zero to upwards of 1000 nm (with 300 nm being a conventional choice).

Upon recognition of thermal transients along bus waveguide 22, heater element 40 will be used to create local changes in the temperature of section 26 of optical waveguide 22. The temperature changes generated by heater element 40 may be controlled to compensate for the recognized transient fluctuations in local temperature of photonic microresonator apparatus 10 and, as a result, maintain a resonant wavelength within disk resonator structure 20.

In this illustrated example, heater element 40 may comprise a doped region 42 of silicon surface layer 18 that is disposed adjacent to section 26 of optical bus waveguide 22. Electrical contacts 44 and 46 may be disposed at either end termination of doped region 42, with the heater control signal $V_{temp}$ applied between contacts 44 and 46. Region 42 of silicon surface layer 18 may be doped with an appropriate material (of either n-type or p-type conductivity, as desired) that forms a resistive effect along region 42 in the presence of an applied voltage (i.e., $V_{temp}$) between contacts 44 and 46. The presence of this resistive effect creates local heating along region 42, modifying the refractive index value of adjacent section 26 of optical waveguide 22.

Figure 2:
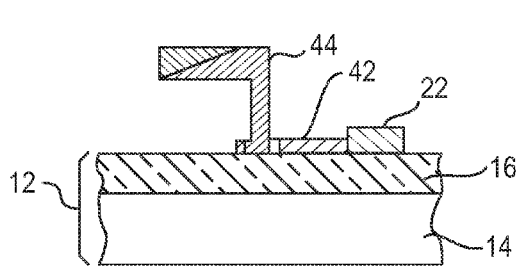
FIG. 2 is a cut-away side view taken along line 2-2 of FIG. 1.
Figure 3:
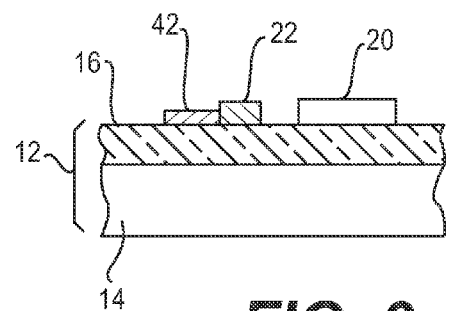
FIG. 3 is a cut-away side view taken along line 3-3 of FIG. 1.

FIG. 2 is a cut-away side view taken along line 2-2 of FIG. 1, illustrating the relationship between heater contact 44, doped region 42 and optical bus waveguide 22. FIG. 3 is a cut-away side view taken along line 3-3 of FIG. 1, illustrating the relationship between doped region 42, optical bus waveguide 22 and disk resonator structure 20.

In accordance with the embodiments shown in FIGS. 1-3, region 42 may be either an n-doped or p-doped section of silicon surface layer 18. For example, region 42 may be doped (e.g., by ion implantation) to a doping concentration generally in the range of $10^{17}$ to $10^{19}$ cm$^{-3}$ with a semiconductor impurity dopant such as boron (B), phosphorous (P) or arsenic (As). The monocrystalline silicon material, of which silicon surface layer 18 is formed, has a thermo-optic effect, dη/dT (i.e., change in refractive index as a function of temperature,) that is relatively large—on the order of $2.2 \times 10^{-4\circ}$ C. Therefore, when a voltage $V_{temp}$ is applied between contacts 44 and 46 of region 42, the resistive-induced change in temperature will create a change in refractive index. For example, a temperature change of 400° C. will create a change in refractive index within section 26 of optical bus waveguide 22 on the order of 0.09.

This change in refractive index will, in turn, slightly change the coupling conditions between the optical waveguide and the resonator structure, allowing for the resonant wavelength of apparatus 10 to be stabilized at a selected wavelength value in the presence of transient temperature fluctuations.

While this embodiment depicts heater element 40 as formed adjacent to section 26, it is also possible to form heater element 40 over section 26, using conventional CMOS processing techniques to deposit a layer of silicon over a portion of optical bus waveguide 22, and subsequently dope the deposited silicon layer to create a heater element.

Figure 4:
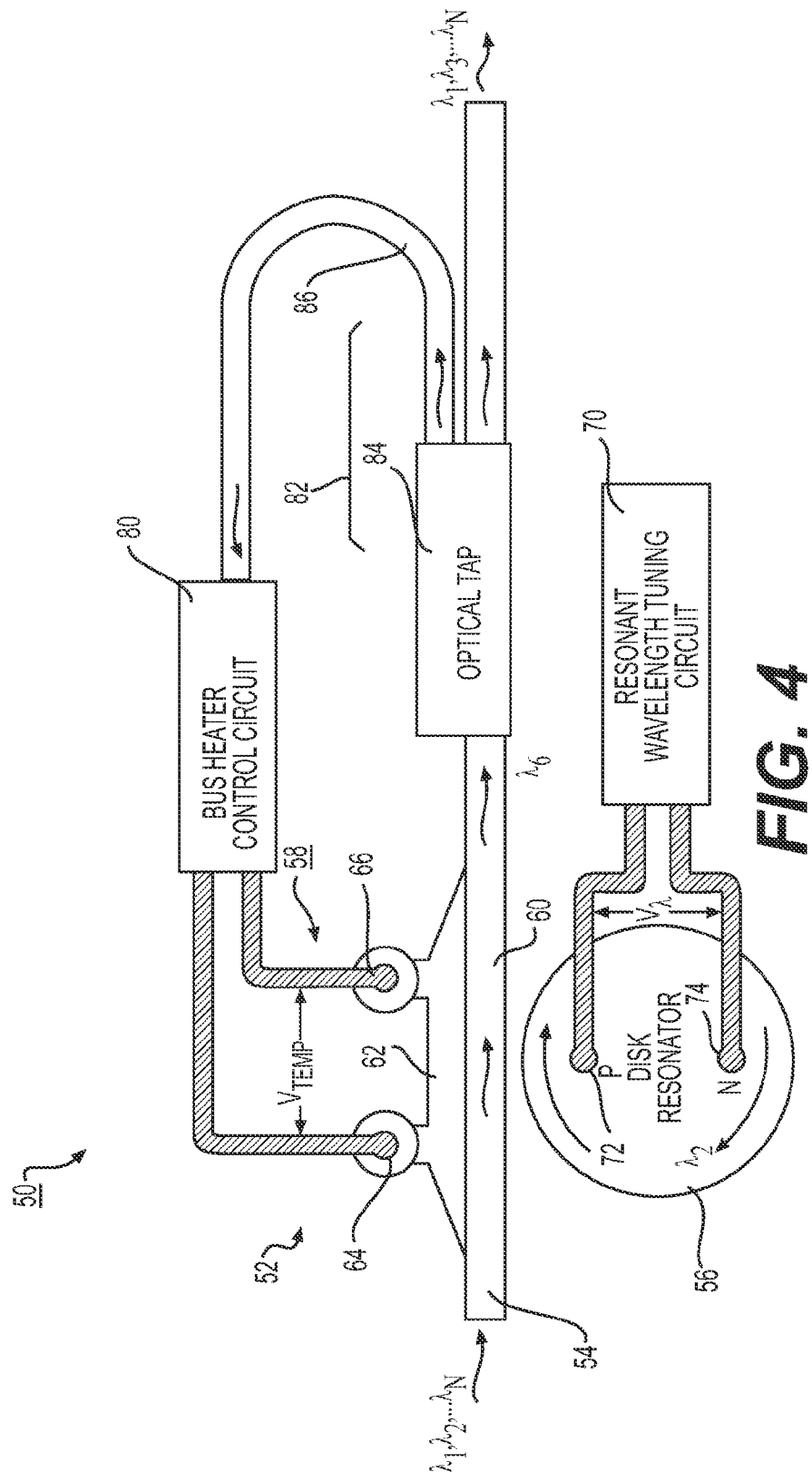
FIG. 4 is a top view of a system that includes an exemplary silicon-based photonic microresonator apparatus, as well as elements used to provide both wavelength tuning of the resonator structure and temperature tuning of the associated bus waveguide according to an embodiment of the present invention.

FIG. 4 is a top view of an exemplary system 50 that includes an exemplary photonic microresonator apparatus 52, as well as elements used to provide both wavelength tuning of a resonator structure and temperature tuning of the associated bus waveguide.

In particular, microresonator apparatus 52 is shown as comprising an optical bus waveguide 54 and a disk resonator structure 56. A heater element 58 may be disposed adjacent to a section 60 of optical bus waveguide 54 that is substantially close to disk resonator 56. Heater element 58 itself includes a doped silicon region 62 of the silicon surface layer, as well as electrical contacts 64 and 66 disposed at either end of doped silicon region 62. As shown, system 50 further comprises a resonant wavelength tuning circuit 70, which is coupled between a p-doped region 72 and an n-doped region 74 of disk resonator structure 56. As discussed above, the application of a predetermined voltage $V_\lambda$ will modify the optical length of disk resonator structure 56, thus changing the initially-selected resonant wavelength of disk resonator structure 56 to a new selected value. It should be understood that resonant wavelength tuning circuit 70 is utilized only to modify the selected resonant wavelength value of photonic microresonator apparatus 10; - - - no adjustments, to compensate for transient thermal fluctuations, are performed by circuit 70.

Instead, adjustments to compensate for transient thermal fluctuations are provided in system 50 by a bus heater control circuit 80. As shown, bus heater control circuit 80 is used to create the temperature adjustment voltage $V_{temp}$ that is applied across heater element 58. A feedback arrangement 82, including an optical tap coupler 84 and optical waveguide 86 are included within system 50 to provide an input signal to bus heater control circuit 80, and to allow for the temperature of waveguide section 60 to be precisely controlled so that the stability of the selected resonant wavelength is maintained.

Feedback arrangement 82 may operate as follows. A portion of an optical signal propagating along bus waveguide 54 will be coupled into waveguide 86 by tap coupler 84, and, thereafter, propagate along waveguide 86 into bus heater control circuit 80. Tap coupler 84 may be a conventional, passive optical coupler that transfers a relatively small portion of the propagating optical signal onto a 'tap' waveguide (in this case, optical waveguide 86). For example, a conventional tap coupler may transfer a signal of about 10% of an input signal power, this 10% value considered to be exemplary of a "relatively small" value (although other powers less than or greater than 10% may be used, if necessary).

Control circuit 80 receives the transferred portion of the optical signal and converts the optical signal into an electrical equivalent (using a standard photodetector, for example), referred to as a photocurrent. Additional electronic circuitry may be included within control circuit 80 to create the voltage $V_{temp}$, which is applied to heater element 58. By randomly varying the applied voltage and correlating the applied voltage with the photocurrent received by control circuit 80, processing circuitry within control circuit 80 is operable to estimate the voltage require to maintain the stability of the resonant wavelength associated the resonator structure (e.g., diode).

Figure 5:
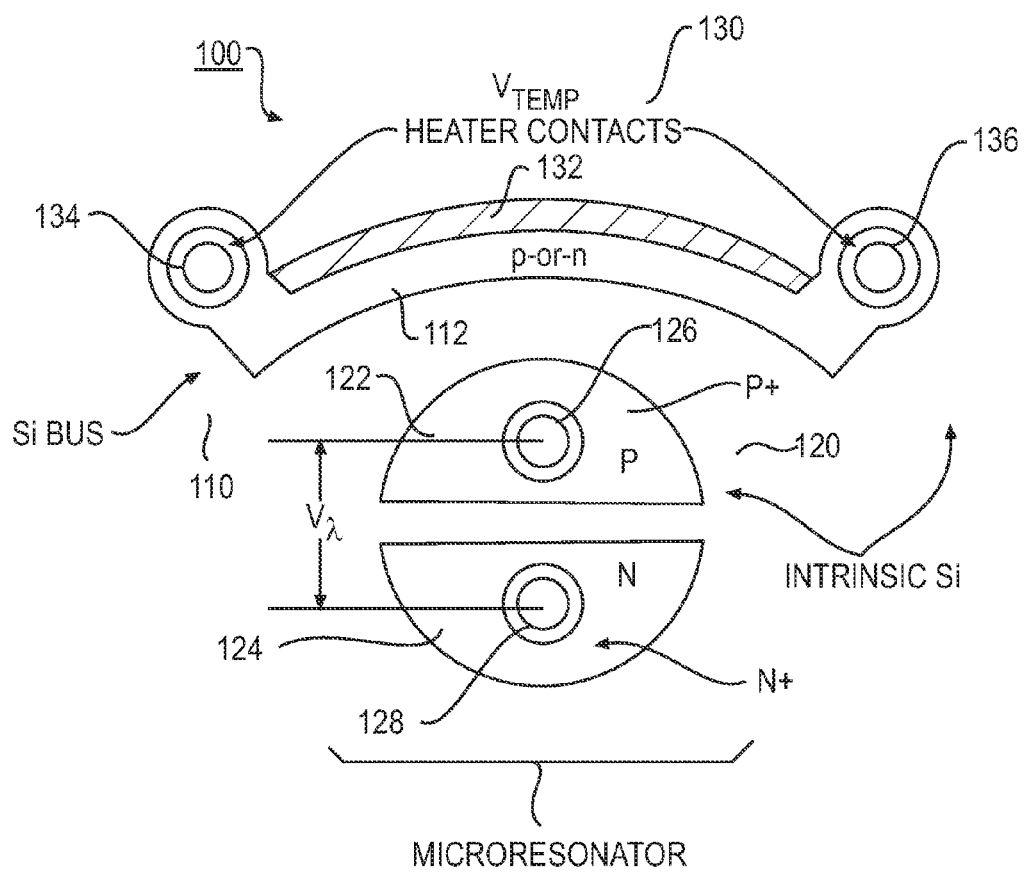
FIG. 5 is a top view of an embodiment of the present invention that utilizes a curved optical bus waveguide in combination with a resonator structure.

FIG. 5 is a top view of another embodiment of the present invention. A photonic microresonator 100 is shown as comprising an optical bus waveguide 110 and associated disk resonator structure 120. In this particular embodiment, disk resonator structure 120 may comprise a p-doped region 122 and an n-doped region 124. As described above, doped regions 122 and 124 are used to create changes in the resonant wavelength of disk resonator structure 120 by the application of voltage $V_\lambda$ between their contacts 126 and 128, respectively. A heater element 130 is shown as comprising a doped silicon region 132 adjacent to a section 112 of optical bus waveguide 110, with a pair of heater contacts 134 and 136 formed at either end of doped region 132. As before, the application of a voltage $V_{temp}$ between contacts 134 and 136 will increase the temperature of doped region 132, thus also heating adjacent optical bus section 112 resulting in the modification of the wavelength of the signal propagating through section 112.

In one embodiment, optical bus waveguide 110 may be curved so as to substantially match the curvature of disk resonator structure 120, and extend the length of the region where the two elements are in proximity to each other. By extending the length of this region, the coupling efficiency between waveguide 110 and disk resonator structure 120 may be increased, by virtue of extending the region where the optical modes will overlap each other. As is also known in the art, the introduction of a bend into a waveguide will introduce modal changes that improve phase matching between the optical signal propagating along the waveguide and the optical signal evanescently coupled into the resonator structure, which may also enhance coupling efficiency.

While the embodiments described above use or depict a single resonator structure in combination with an optical bus waveguide, it is to be understood that additional embodiments may include a plurality of resonators, each capable of exhibiting or operating at a different resonant wavelength, in conjunction with a single optical bus waveguide.

Figure 6:
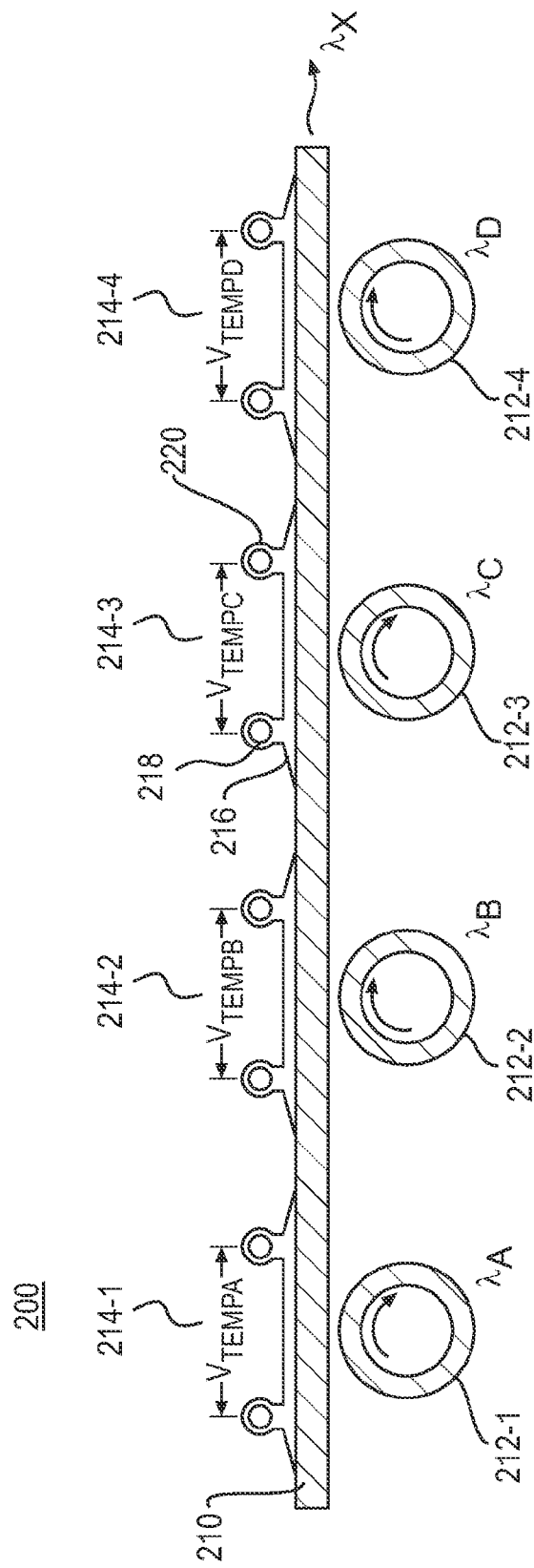
FIG. 6 illustrates a silicon-based photonic microresonator system that includes an input bus waveguide and a plurality of ring resonators formed along the waveguide according to an embodiment of the present invention.

FIG. 6 illustrates a resonator system 200 that includes an input bus waveguide 210 and a plurality of ring resonator structures 212-1, 212-2, 212-3 and 212-4 disposed in series along the longitudinal extent of input bus waveguide 210 in accordance with yet another embodiment. In this embodiment, each ring resonator structure may be formed to exhibit or operate at a different selected resonant wavelength, shown in FIG. 6 as $\lambda_A$, $\lambda_B$, $\lambda_C$ and $\lambda_D$. In accordance with the present invention, a separate heater element 214 may be disposed along a section of bus waveguide 210 substantially close to each ring resonator structure 21 (e.g., a separation in the range of 0-1000 nm, with a nominal value of 300 nm, for a silicon-based system). These waveguide sections are illustrated as 210-1, 210-2, 210-3 and 210-4 in FIG. 6, with each associated heater element shown as 214-1, 214-2, 214-3 and 214-4.

Similar to the various embodiments described above, each heater element 214 includes a doped silicon region 216 disposed adjacent to its associated waveguide section, with a pair of electrical contacts 218, 220 coupled to either end of doped silicon region 216.

In accordance with the present invention, a separate measurement may be performed at each resonator location to recognize the presence of transient thermal effects that require adjustments to the temperature of that local section of optical bus waveguide 210 so as to maintain the value of the local, selected resonant wavelength. The adjustments may all be performed independently, with each heater element controlled by a different heater signal, denoted as $V_{tempA}$, $V_{tempB}$, $V_{tempC}$, and $V_{tempD}$.

Figure 7:
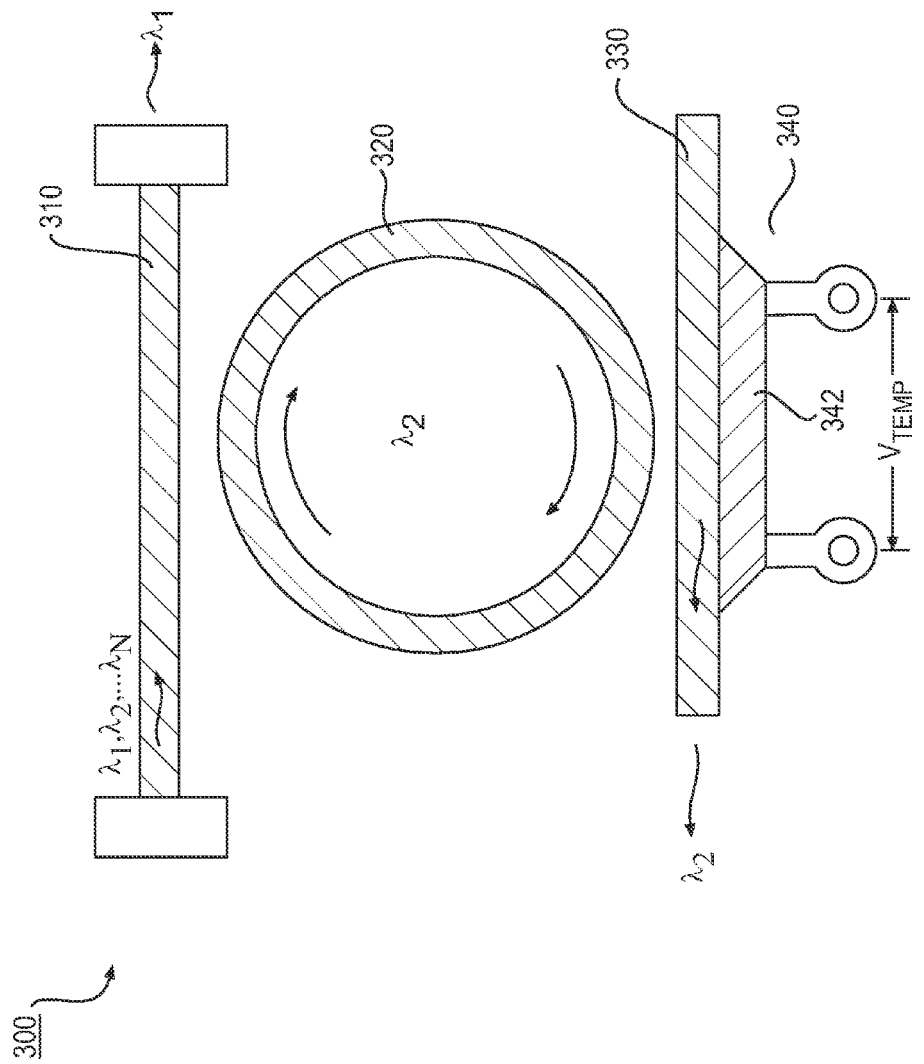
FIG. 7 illustrates another silicon-based photonic microresonator system that includes both an input bus waveguide and an output bus waveguide, with the heater element formed along the output bus waveguide according to an embodiment of the present invention.

FIG. 7 illustrates an exemplary optical system 300 that utilizes a waveguide-based heater element to maintain stability of the resonant wavelength of system 300 in accordance with yet another embodiment of the invention. As shown, system 300 includes an input optical bus waveguide 310, an optical ring resonator structure 320 and an output optical waveguide 330. As with the arrangements described above, it can be presumed that a plurality of different optical signals, each operating at a different wavelength, are propagating along input optical bus waveguide 310. In this configuration, optical ring resonator structure 320 may be formed to couple (e.g., evanescently) the signal propagating at wavelength $\lambda_{res}$, with the remaining optical signals continuing to propagate along input optical bus waveguide 310.

In this particular embodiment, the signal propagating within ring resonator structure 320 may be subsequently coupled into output optical waveguide 330. As shown in FIG. 7, a heater element 340 for providing stability of the selected resonant wavelength value in the presence of thermal fluctuations may be formed along output optical waveguide 330. This is in contrast to the arrangements described above where the heater element is formed along the input bus waveguide. However, the principles of operation remain substantially the same. That is, the application of a voltage $V_{temp}$ across a section of doped silicon 342 of heater element 340 causes an increase in temperature of an adjacent portion of output optical waveguide 330. As discussed above, this change in temperature can be used to compensate for transient thermal fluctuations that would otherwise create a drift in the selected resonant wavelength value.

It is to be understood that fabrication of silicon-based photonic microresonators in accordance with the present invention is compatible with conventional CMOS integrated circuit processing techniques so that electronic circuitry (for example, the heater control circuit and/or resonant wavelength tuning circuit) can be fabricated on the same silicon-based substrate as the optical waveguides and resonator structures.

The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A photonic microresonator apparatus comprising:
    a photonic resonator structure formed on a silicon substrate and configured to operate at a selected resonant wavelength;
    an optical bus waveguide formed on the silicon substrate and disposed to provide evanescent coupling at the selected resonant wavelength into the resonator structure; and
    a heater element disposed adjacent to a section of the optical bus waveguide, and substantially close to the resonator structure, the heater element comprising a region of doped silicon configured to,
        modify a temperature of the adjacent section of the optical bus waveguide upon the application of a voltage thereto, the temperature changed by an amount adjusted to compensate for transient thermal fluctuations in the resonator structure, and to maintain the resonant wavelength at the selected resonant wavelength.

2. The photonic microresonator apparatus as in claim 1 wherein the photonic resonator structure comprises an optical ring resonator.

3. The photonic microresonator apparatus as in claim 2 wherein the optical ring resonator is selected from the group consisting of: circular resonator, oval resonator, elliptical resonator.

4. The photonic microresonator apparatus as in claim 1 wherein the photonic resonator structure comprises an optical disk resonator.

5. The photonic microresonator apparatus as in claim 1 further comprising a wavelength tuning element for changing the selected resonant wavelength of the photonic resonator structure to a new, different selected resonant wavelength.

6. The photonic microresonator apparatus as in claim 1 wherein the optical waveguide is configured to have a radius of curvature that is substantially similar to a curvature of the photonic resonator structure so as to increase an optical path length along which evanescent coupling occurs, and the optical bus waveguide and the photonic resonator structure are configured to increase an optical coupling efficiency.

7. The photonic microresonator apparatus as in claim 1 wherein the apparatus further comprises a heater control feedback section comprising:
    an optical tap coupler disposed along a portion of the optical bus waveguide, and configured to couple a substantially small amount of an optical signal propagating along the bus waveguide;
    a feedback optical waveguide connected to the optical tap coupler and configured to receive the coupled optical signal; and
    a heater control circuit configured to,
        convert the coupled optical signal into an equivalent electrical photocurrent; and
        determine a proper output voltage signal to modify the temperature of the heater element to compensate for the transient thermal fluctuations by correlating random values of the output voltage signal with changes in the received photocurrent and selecting the proper output voltage required to stabilize the selected resonant wavelength in the presence of transient thermal fluctuations.

8. The photonic microresonator apparatus as in claim 1 wherein the heater element is disposed adjacent to the optical waveguide on the substrate surface.

9. The photonic microresonator apparatus as in claim 8 wherein the heater element comprises a doped section of silicon substrate.

10. The photonic microresonator apparatus as in claim 1 wherein the heater element is disposed above and in proximity to the optical waveguide.

11. A photonic microresonator system comprising:
    an optical bus waveguide formed on a silicon substrate and configured to receive a plurality of propagating optical signals, each optical signal operating at a different wavelength;
    a plurality of photonic microresonator structures disposed along, and in proximity to, the optical bus waveguide, each photonic microresonator structure configured to operate at a different resonant wavelength; and
    a plurality of separate heater elements, each element disposed adjacent to a section of the optical bus waveguide and substantially close to a separate one of the plurality of photonic microresonator structures, each heater element comprising a region of doped silicon, and configured to,
        modify a temperature of the adjacent section of the optical bus waveguide upon the application of a voltage thereto, the temperature changed by an amount desired to compensate for transient thermal fluctuations in the wavelengths of the propagating optical signals.

12. A method for maintaining a resonant wavelength of a photonic microresonator comprising:
    forming a photonic resonator structure on a silicon substrate and configuring the resonator structure to operate at a selected resonant wavelength;

forming an optical bus waveguide on the silicon substrate in proximity to the resonator structure; and disposing a heater element adjacent to a section of the optical bus waveguide, and substantially close to the resonator structure, the heater element comprising a region of doped silicon configured for, modifying a temperature of the adjacent section of the optical bus waveguide upon the application of a voltage thereto, the temperature changed by an amount adjusted to compensate for transient thermal fluctuations in the resonator structure, and to maintain the resonant wavelength at the predetermined resonant wavelength.

13. The method as in claim 12 wherein the photonic resonator structure comprises an optical ring resonator.

14. The method as in claim 12 wherein the optical ring resonator is selected from the group consisting of: circular, oval and elliptical.

15. The method as in claim 12 wherein the photonic resonator structure comprises an optical disk resonator.

16. The method as in claim 12 further comprising changing the resonant wavelength of the photonic resonator structure using a wavelength tuning element.

17. The method as in claim 12 wherein the optical waveguide has a radius of curvature that is substantially similar to a curvature of the photonic resonator structure.

18. The method as in claim 12 wherein the method further comprises:

coupling a substantially small amount of an optical signal propagating along the bus waveguide;

converting the coupled optical signal into an equivalent electrical photocurrent; and determining a proper output voltage signal to modify the temperature of the heater element to compensate for the transient thermal fluctuations by correlating random values of the output voltage signal with changes in the received photocurrent and selecting the proper output voltage required to stabilize the selected resonant wavelength in the presence of transient thermal fluctuations.

* * * * *